Sept. 3, 1968  A. W. ZINN  3,400,276
DIRECTIONAL RADIATION SENSOR COMPRISING A
THREE-DIMENSIONAL PHOTOSENSITIVE SURFACE
Filed Dec. 29, 1965  2 Sheets-Sheet 1
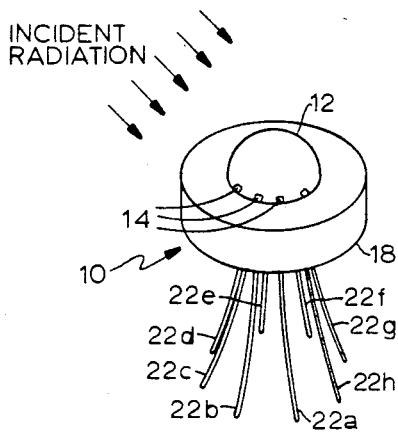
FIG. 1
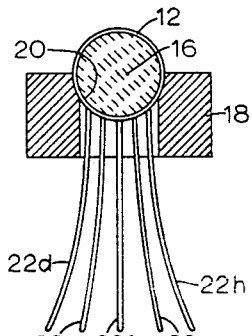
FIG. 2
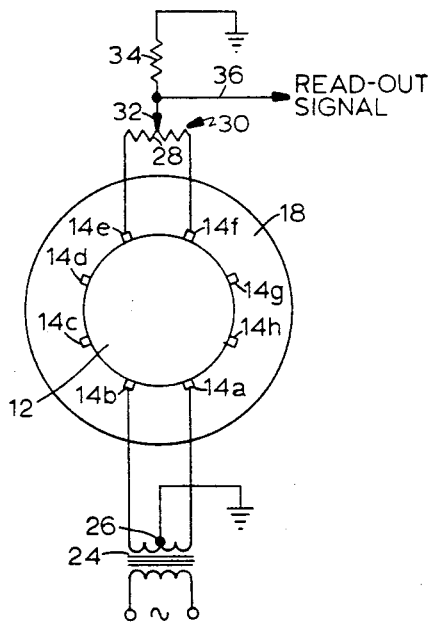
FIG. 3
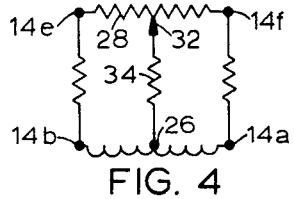
FIG. 4
FIG. 5(a)
FIG. 5(b)
FIG. 5(c)
TIME →
FIG. 5
ALFRED W. ZINN
*INVENTOR.*
BY
*Francis P. Moselle*
ATTORNEY Sept. 3, 1968           A. W. ZINN          3,400,276
DIRECTIONAL RADIATION SENSOR COMPRISING A
THREE-DIMENSIONAL PHOTOSENSITIVE SURFACE
Filed Dec. 29, 1965                              2 Sheets-Sheet 2

ALFRED W. ZINN
INVENTOR.

BY
*Francis L. Masselle*

ATTORNEY

United States Patent Office 3,400,276
Patented Sept. 3, 1968

3,400,276
DIRECTIONAL RADIATION SENSOR COMPRISING A THREE-DIMENSIONAL PHOTOSENSITIVE SURFACE
Alfred W. Zinn, Monsey, N.Y., assignor to General Precision Inc., Little Falls, N.J., a corporation of Delaware
Filed Dec. 29, 1965, Ser. No. 517,372
11 Claims. (Cl. 250—211)

This invention relates to radiation sensors and, in particular, to radiation sensing devices and systems applicable as "sun-trackers" in the guidance of missiles and like space vehicles.

A wide variety of "sun tracking" devices are known to the art and the wide-spread emphasis on and interest in the development of space vehicles for both military and scientific purposes have given a tremendous impetus to the development of new, and improvement of old, radiation sensing and tracking systems. The shortcomings of devices and systems known heretofore include complexity, high cost, delicacy and bulkiness, all of which stem from the need for an external optical system for collecting and directing the sensed radiation and/or for some form of radiation modulator, such as a rotating prism. In such cases, the actual sensing element, per se, is of planer configuration and simple construction; it is the auxiliary optical systems (which may consist of reflective, refractive, and shadowcasting components, or a combination of such components) that add weight, cost, complexity, fragility, etc.

With this state of the art in view, it is the fundamental general object of the present invention to eliminate or mitigate at least one of the problems outlined hereinabove.

A more specific object is the provision of novel radiation sensors which require no auxiliary optical systems and/or radiation modulators.

Another object is the provision of improved radiation sensors which are smaller in size, more rugged in construction, lighter in weight and lower in cost than comparable prior art devices A further object is the provision of unique radiation sensors which are susceptible of facile manufacture with a high degree of precision using standard fabrication techniques To the fulfillment of these and other objects the present invention contemplates a radiation sensor which comprises a three-dimensional photosensitive surface having at least two planes of symmetry intersecting at right angles along a line through the center of symmetry of the surface and having electrode means for applying an energizing potential to the surface at spaced locations symmetrically arrayed with respect to the center of symmetry. Pick-off means are provided for deriving from the surface an output signal dependent upon the orientation of the surface with respect to a source of photoeffective radiation.

Additional objects of the invention, its advantages, scope, and the manner in which it may be practiced will be more fully apparent from the following description of exemplary embodiments thereof, taken in conjunction with the subjoined claims and annexed drawings in which like parts are designated by like reference characters throughout the several views and wherein:

FIG. 1 is a perspective elevational view of a radiation sensor in accordance with the present invention;

FIG. 2 is a sectional view of the device shown in FIG. 1;

FIG. 3 is a top plan view of the device shown in FIGS. 1 and 2 with operating circuitry shown schematically;

FIG. 4 is a partial equivalent circuit diagram of the device shown in FIG. 3;

Figure 6:
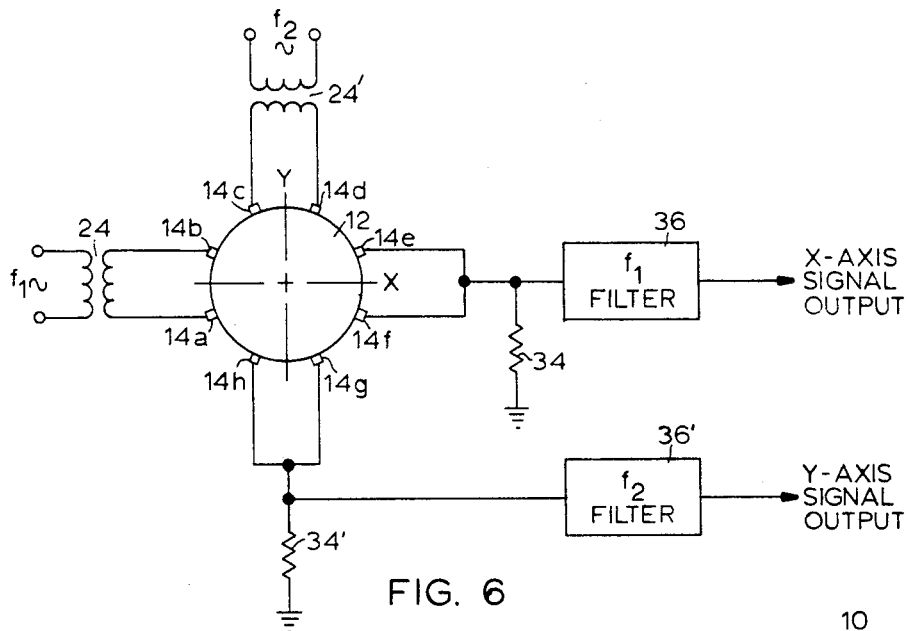
Figure 7:
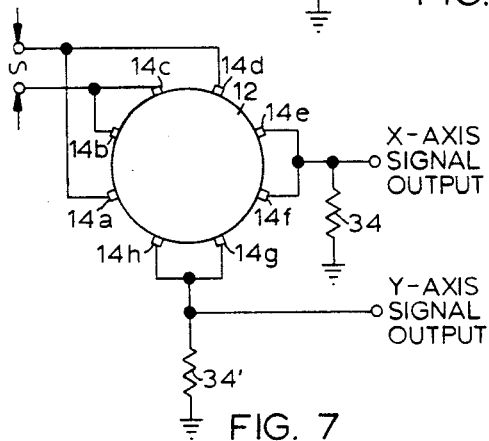
Figure 8:
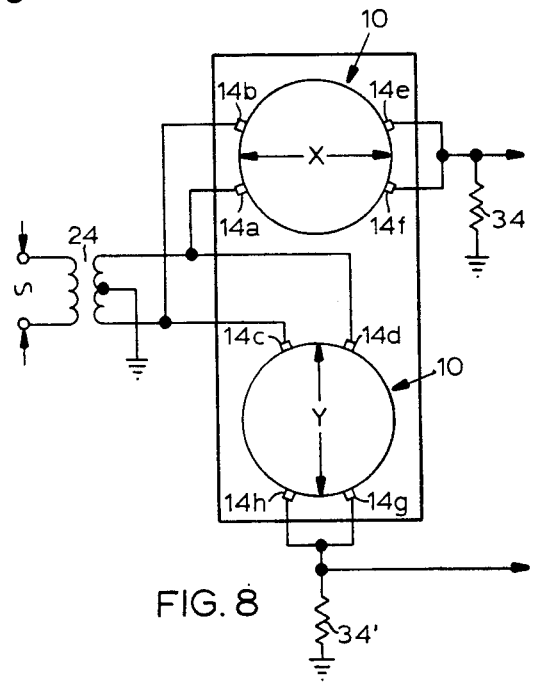

FIGS. 5a, 5b, and 5c are time-voltage curves which will be referred to in explanation of the principles of the invention;

FIG. 6 is a diagrammatic view of a radiation sensor in accordance with the present invention with a particular form of operating circuitry;

FIG. 7 is a view similar to FIG. 6 with a modified form of operating circuitry; and FIG. 8 is a modified form of radiation sensing device utilizing two individual radiation sensing elements.

Referring now to the drawings and first in particular to FIGS. 1 and 2, there is illustrated a presently preferred form of radiation sensor 10 in accordance with the present invention. Sensor 10 consists of a surface 12, in the configuration of a spherical segment of one base, formed of photosensitive material and having a plurality of small area electrodes 14 symmetrically arrayed on surface 12. The spherical segment making up surface 12 may, of course, be a hemisphere. The locus of electrodes 4 may be a great circle, i.e., defined by the intersection of a diametral plane with surface 12, or a lesser circle, generated by a chordal plane through the surface.

In the illustrated embodiment eight electrodes, designated 14a–14h in FIG. 3, are shown; a greater number can be used but in any case there must be a minimum of two electrodes to each quadrant of the circle on which they are deployed. In the particular construction shown, surface 12 takes the form of a thin uniform coating applied to a dielectric ceramic sphere 16. An annular mounting block or base member 18 of electrically non-conductive material such as Bakelite has an internal seat 20 on which sphere 16 is disposed and secured, as by means of an epoxy resin adhesive. With such a construction, electrodes 14 may take the form of gold foil tabs or vapor-deposited film segments applied to seat 20 prior to insertion of the sphere. Each electrode has a respective wire lead, i.e., 22a, 22b, 22c, 22d, 22e, 22f, 22g, and 22h, extending through mounting block 18 for connection with operating and signal utilization circuits as hereinafter described.

A wide variety of photosensitive materials are known and satisfactory for the formation of surface 12; for example, lead sulfide, cadmium sulfide, cadmium selenide, zinc selenide and many others as well as various mixtures of compounds such as cadmium sulfide-selenide. While as a practical matter, the geometry of the surface lends itself to fabrication as a polycrystalline film applied to a substrate of the desired configuration, there is no theoretical reason why the surface could not be self-supporting and formed of a single crystal, e.g., a single-crystal boule of a suitable semi-conductor material. As a matter of fact the geometry of surface 12 (which need not be a sphere, as hereinafter will appear) in some cases may coincide with the natural crystallization habit of a suitable semiconductor material; moreover, the habit is subject to a measure of control as is well known in the crystallization art and, therefore, may be modified chemically (by addition of habit-modifying agents), mechanically (by use of growth-limiting baffles), by selection of the crystallographic orientation of a seed crystal, or in any other appropriate manner.

Reverting to the matter of suitable photo-sensitive materials, the particular type of greatest practical utility in connection with the invention are semi-conductive materials exhibiting pronounced photoconductivity, i.e., conductivity which varies directly with the intensity of incident photo-effective radiation (radiation of effective wavelengths and of an intensity at or above a threshold value). Many photoconductive materials respond to radiation of a broad range of wavelengths including all or a large part of the visible light spectrum and exhibit proportional changes in resistivity of several orders of magnitude between their dark state and maxium conductivity.

As a specific example of a method of fabricating surface 12 which yields satisfactory results, a coating of lead sulfide was applied on a ceramic spherical substrate by chemical deposition and the coating sensitized by heating in air. A superior method of obtaining higher sensitivity is to evaporate lead sulfide onto the substrate in a vacuum, followed by heat-cycling the deposited layer in a controlled atmosphere of oxygen for a suitable length of time as described by L. Sosnowski, J. Starkiewicz and O. Simpson, Nature, 159,818 (1947).

Reference is now made to FIGS. 3 and 4 which will be employed to explain the principle of operation of a sensor in accordance with the present invention.

An A-C potential is applied between two adjacent electrodes 14a and 14b. To this end a transformer 24 has its secondary winding connected between electrodes 14a and 14b and has a center tap 26 connected to ground potential. The primary winding of transformer 24 is connected across a suitable source of A-C voltage, e.g., 110 volts, 60 cycle. Thus, an A-C potential is applied which is 180° out of phase at electrodes 14a and 14b; however, it will be appreciated that the phase difference between electrodes need not be 180°. For example, four electrodes in each quadrant may be energized with an A-C potential having a 90° phase difference between adjacent electrodes.

For deriving one output signal a second pair of electrodes, 14e and 14f in the quadrant opposite that which contains electrodes 14a and 14b, are connected across the resistance 28 of a balancing potentiometer 30 having a sliding tap 32 connected to ground potential through a load resistance 34. The output signal voltage is derived across load resistance 34 on conductor 36 which, for the purposes of this explanation, may be considered as leading to the vertical deflection plates of an oscilliscope, not shown. It will be observed from FIG. 3 that the current path between electrodes 14a and 14f and between electrodes 14b and 14e extends through an intervening portion of the material comprising surface 12 and, therefore, contains the resistance offered by this material. As best evident in FIG. 4, the complete current paths constitute a hybrid polyphase bridge circuit which, assuming uniform resistivity throughout the surface 12, is balanced. (If necessary, balance may be achieved by adjustment of balancing potentiometer tap 32.)

Under uniform illumination over the entire surface 12, then, the bridge circuit is balanced, no current flows through load resistance 34, and the voltage applied to the deflection plates of the oscilliscope is zero. This gives the oscilliscope trace shown in FIG. 5a. While this condition has been referred to as uniform illumination, it will be appreciated that the same result obtains when the illumination incident upon surface 12, although not uniform, is symmetrically distributed with respect to the center of symmetry of the surface. Such a condition would be achieved when a light source is disposed on a line perpendicular to the plane of the circle of electrodes 14 and passing through the center thereof. When the light source is shifted to the left of the center position, as viewed in FIG. 3, a shadow is cast on the righthand portion of the surface 12; due to the change in impedance, the bridge is unbalanced with the result that an output signal represented by the trace shown in FIG. 5b is produced. Likewise, when the light source is displaced to the right, there is produced a similar output signal but 180° out of phase as shown in FIG. 5c.

A radiation sensor 10 of the type already described is shown in FIG. 6 arranged in an actual operating circuit for detecting displacement about two mutually perpendicular axes $x$ and $y$ relative to a light source. One pair of adjacent electrodes 14a and 14b are connected across an A-C potential having a frequency $f_1$, as by means of a transformer 24. Electrodes 14e and 14f in the opposite quadrant are interconnected to the high end of load resistor 34, the other end of which is connected to ground potential. A narrow band-pass filter 36, designed to reject frequencies other than $f_1$, is connected to read out the signal voltage developed across the load resistance. In like manner, a pair of adjacent electrodes 14c and 14d in one of the remaining quadrants is connected across a source of A-C potential having a frequency $f_2$ substantially different from $f_1$, as by means of a transformer 24'. The electrodes 14g and 14h in the quadrant opposite that containing electrodes 14c and 14d are interconnected to the high end of a load resistance 34', the other end of which is connected to ground potential. A second narrow band pass filter 36' adapted to reject frequencies other than $f_2$ connected to read out the signal developed across load resistance 34'.

Thus, it will be seen that two separate channels and two bridge circuits are formed separated by the difference in operating frequencies $f_1$ and $f_2$. With sensor 10 directly centered on the light source being tracked, illumination on surface 12 is uniform or varies symmetrically about its center of symmetry. Under these conditions, both resistance bridge circuits are balanced and there is no signal produced in either channel. Now, assuming the light source to be stationary, if sensor 10 is displaced angularly about the $x$ axis, a shadow is cast on surface 12 on one side of the other of the $x$-axis, depending on the sense or direction of rotation. Consequently, the resistance of the shaded portion of surface 12 increases relative to the unshaded portion, unbalancing the $x$ axis bridge network and producing an output signal across resistor 34, in the form of an A-C potential of frequency $f_1$ and amplitude proportional to the amount of displacement. Under these conditions, no signal is generated in the $y$-axis channel because the shadow caused by displacement about the $x$-axis is symmetrical with respect to the $y$-axis; therefore, the resulting impedance change is equal in sense and magnitude on both sides of the $y$-channel bridge network so that balance of the bridge is maintained.

From the preceding description it will be apparent that displacement about the $y$-axis only produces a signal appearing in the $y$-channel, and that compound displacement about both $x$ and $y$ axes produces signals in both channels proportional to the respective components of the displacement about the individual axes. The frequency difference in the two channels enables filters 36 and 36' to segregate the respective output signals despite any cross-modulation which may exist between the channels.

If, instead of an individual readout signal representative of displacement along two orthogonally related axes, a nulling device is desired in which it is sufficient that the output signal be balanced as by means of a servo system, which adjusts the orientation of the sensor, the operating circuit configuration shown in FIG. 6 may be simplified to that shown in FIG. 7. In the latter, A-C potentials of the same frequency are employed in both channels and band pass filters 36, 36' are eliminated. The servo mechanism utilized to null the output signals may be wholly conventional and, therefore, is not illustrated in FIG. 7.

In a further modification of the invention, illustrated in FIG. 8, individual sensors 10 and 10' are utilized to provide a two-axis device in which the signal channels are provided each with a separate sensor. This eliminates the need for separate frequencies and filters employed in the FIG. 6 embodiment.

As appears in FIG. 8, sensors 10 and 10' are mounted in fixed juxtaposed relation on a suitable support or base which is schematically designated at 38. Sensor 10 includes a pair of input electrodes 14a, 14b located in one quadrant of a circle and a pair of output electrodes 14e, and 14f in an opposite quadrant of the circle. It will be noted that both input and output electrodes individually are symmetrically spaced with respect to a diameter of the circle which coincides with one sensing axis, $x$, of the device. Sensor 10′, likewise, has a pair of input electrodes 14c, 14d and output electrodes 14g, 14h in opposite quadrants of a circle and symmetrically spaced with respect to a diameter which coincides with the other sensing axis, $y$, and is angularly displaced by 90° relative to axis/diameter $x$ of sensor 10.

As in previously described embodiments, output electrodes 14e, 14f of sensor 10 are interconnected to the high end of a load resistor 34, the low end of which is connected to ground potential and output electrodes 14g, 14h of sensor 10′ are interconnected to the high end of a load resistance 34′, the low end of which is connected to ground potential. An A-C potential is applied to both pairs of input electrodes 14a, 14b and 14c, 14d by means of a single transformer 24. The voltage developed across load resistance 34 represents the $x$-axis output signal and the voltage developed across load resistance 34′ represents the $y$-axis output signal.

While the sensors disclosed all comprise spherical segmental surfaces, it will be understood that a wide variety of geometrical configurations may be employed, e.g., tetragons, cones, pairs of hemicylinders disposed at right angles, etc.

While there has been described what at present are believed to be the preferred embodiments of this invention, it will be obvious to those skilled in the art that various modifications can be made therein within the scope of the invention and it is intended that the appended claims cover all such modifications.

What is claimed is:

1. A radiation sensor, comprising:
   a three-dimensional photosensitive surface having at least two planes of symmetry intersecting at right angles along a line through the center of symmetry of the surface;
   electrode means for applying an energizing potential to said surface at spaced locations symmetrically arrayed with respect to said center of symmetry; and
   means for deriving from said surface an output signal dependent upon the orientation of said body with respect to a source of photo-effective radiation.

2. A radiation sensor according to claim 1, wherein said surface is a spherical segment of one base.

3. A radiation sensor comprising:
   a pair of individual sensors in accordance with claim 2, mounted in a fixed juxtaposed relation, said electrode means and signal deriving means on each of said individual sensors consisting of a plurality of small area electrodes disposed in contact with said photosensitive surface at points equidistant from the center of symmetry thereof, the locus of said points being a circle, there being on each of said individual sensors a pair of electrodes in each of two opposite quadrants of the circle, symmetrically disposed on either side of a diameter bisecting said quadrants, the respective diameters of each of said individual sensors being angularly displaced by 90° relative to one another.

4. A radiation sensor according to claim 1, wherein said electrode means includes a pair of small area electrodes contacting said surface at points adjacent an edge thereof, spaced at equal distances from and on either side of one of said planes of symmetry; and said signal deriving means includes a second pair of small area electrodes contacting said surface at points adjacent an opposite edge thereof, spaced at said equal distances from and on either side of said one plane of symmetry.

5. A radiation sensor comprising a pair of individual radiation sensors in accordance with claim 4, mounted in fixed juxtaposed relation, with said one plane of symmetry of one sensor at right angles to said one plane of symmetry of the other sensor.

6. A radiation sensor according to claim 1, including a three-dimensional dielectric body having at least two planes of symmetry intersecting at right angles along a line through the center of symmetry of said body, said three-dimensional surface being formed by a uniform layer of semiconductive material covering at least an active portion of said body symmetrically arrayed about about said center of symmetry thereof, said material responding to changes in photo-effective incident radiation with substantial changes in electrical conductivity.

7. A radiation sensor according to claim 6, wherein said body is a sphere and said active portion subtends a solid angle of up to $2\pi$ steradians.

8. A radiation sensor according to claim 6, wherein said electrode means and signal deriving means comprise a plurality of small area electrodes disposed in contact with said surface, the locus of said electrodes being a circle, there being at least two electrodes to each quadrant of said circle, the spacing between electrodes in the same quadrant being uniform throughout the quadrants.

9. A radiation sensor according to claim 8, including means for supplying an A-C potential between a pair of adjacent electrodes in one quadrant of the circle.

10. A radiation sensor according to claim 8, including:
    means for applying, between two adjacent electrodes in one quadrant of said circle, an A-C potential of a selected frequency;
    means for applying, between two adjacent electrodes in a second quadrant adjacent said one quadrant of said circle, a second A-C potential of opposite phase and a different frequency with respect to the first-mentioned A-C potential; and
    pickoff means including electric wave filters for separating said selected frequency from said different frequency to derive respective output signals from the electrodes in the remaining quadrants representative of the orientation of said surface relative to a source of photo-effective radiation.

11. A radiation sensor according to claim 8, further comprising:
    means electrically interconnecting the electrodes in one quadrant of said circle and in a second quadrant adjacent said one quadrant to form respective return paths for first and second signal channels; and
    means for applying A-C signal potentials of respectively opposite phase and different frequency to a first and a second pair of said electrodes, each pair being in one of the remaining third and fourth quadrants of said circle.

References Cited

UNITED STATES PATENTS

| 2,879,405 | 3/1959 | Pankove | 250—211 |
| 2,898,525 | 8/1959 | Jacobs | 250—211 X |
| 2,964,636 | 12/1960 | Cary | 250—211 |
| 3,028,500 | 4/1962 | Wallmark | 250—211 |
| 3,033,073 | 5/1962 | Shuttleworth | 250—203 |
| 3,137,794 | 6/1964 | Seward | 250—203 X |
| 3,229,102 | 1/1966 | Spencer et al | 250—203 |

RALPH G. NILSON, *Primary Examiner.*

M. A. LEAVITT, *Assistant Examiner.*